(12) United States Patent
Zaffetti et al.

(10) Patent No.: US 6,709,474 B2
(45) Date of Patent: Mar. 23, 2004

(54) QUICK CONNECT FOR A WATER SEPARATOR HOUSING

(75) Inventors: Mark Zaffetti, Suffield, CT (US); Thomas Vatter, Holyoke, MA (US); Shoufeng Hu, South Windsor, CT (US); Donald E. Army, Jr., Enfield, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/163,170

(22) Filed: Jun. 5, 2002

(65) Prior Publication Data

US 2003/0226337 A1 Dec. 11, 2003

(51) Int. Cl.⁷ .......................... B01D 35/30; B01D 50/00
(52) U.S. Cl. .................. 55/320; 55/503; 96/190
(58) Field of Search ...................... 55/320, 503; 96/190

(56) References Cited

U.S. PATENT DOCUMENTS 3,681,899 A * 8/1972 Grote ........................ 96/147
5,784,894 A 7/1998 Army, Jr. et al.
6,402,798 B1 * 6/2002 Kallsen et al. ............. 55/385.3

* cited by examiner

Primary Examiner—Robert A. Hopkins
(74) Attorney, Agent, or Firm—Carlson, Gaskey & Olds

(57) ABSTRACT

A water separator is provided for use in an environmental control system that includes first and second housing portions at least partially defining an interior cavity. A coalescer assembly that may include a mesh material is disposed within the interior cavity for separating water from the air flowing through the interior cavity. First and second interlocking features, which may include a plurality of circumferentially arranged tabs received in the slots of circumferentially arranged flanges, secure the housing portions together. The tabs and flanges interlock with one another in response to moving the first and second housings relative to one another from and open position to a closed position in which the housing portions are secured to another. In this manner, V-band coupling of the prior art may be eliminated and the service time of the water separator may be reduced.

14 Claims, 3 Drawing Sheets

QUICK CONNECT FOR A WATER SEPARATOR HOUSING

BACKGROUND OF THE INVENTION

This invention relates to an aircraft component housing, and more particularly, the invention relates to a quick connect housing for a water separator.

Environmental control systems for aircrafts typically employ water separators to separate the water from the air to reduce humidity. Typically the water separators have a volume of approximately 4 liters and are under relatively low pressure, for example 22 psig. A coalescer assembly is arranged within the interior cavity of the separator and condenses and collects a fine water mist which is expelled from the separator. Typically every several hundred hours a mesh coalescer material must be removed and replaced.

Typically the water separator housing is constructed from two halves that are secured to one another utilizing a V-band coupling. This coupling has multiple V-retainer segments attached to a flat metal band. When the coupling is tightened over two flanges, the wedging action of the V-retainer draws the flanges together. When the proper level of torque is reached, a tight connection is established. A plurality of fasteners joining mating annular flanges are also utilized with other aircraft component housings such as those used on pneumatic starters and air cycle machines. More specifically, bolts, washers and nuts are received in apertures located circumferentially around the flanges in the other component housings. The V-band coupling fasteners must be tightened to a desired torque value to ensure that the halves are properly secured. As with the servicing of all aircraft components, it is critical that no loose tools or components be left in the aircraft subsequent to servicing, which may result in a catastrophic failure of an aircraft system. Furthermore, it is desirable to service aircraft components quickly to reduce the down time of the aircraft.

SUMMARY OF THE INVENTION AND ADVANTAGES

The present invention provides a water separator for use in an environmental control system that includes first and second housing portions at least partially defining an interior cavity. A coalescer assembly that may include a mesh material is disposed within the interior cavity for separating water from the air flowing through the interior cavity. First and second interlocking features, which may include a plurality of circumferentially arranged tabs received in the slots of circumferentially arranged flanges, secure the housing portions together. The tabs and flanges interlock with one another in response to moving the first and second housings relative to one another from an open position to a closed position in which the housing portions are secured to another. In this manner, the V-band coupling of the prior art may be eliminated and the service time of the water separator may be reduced.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
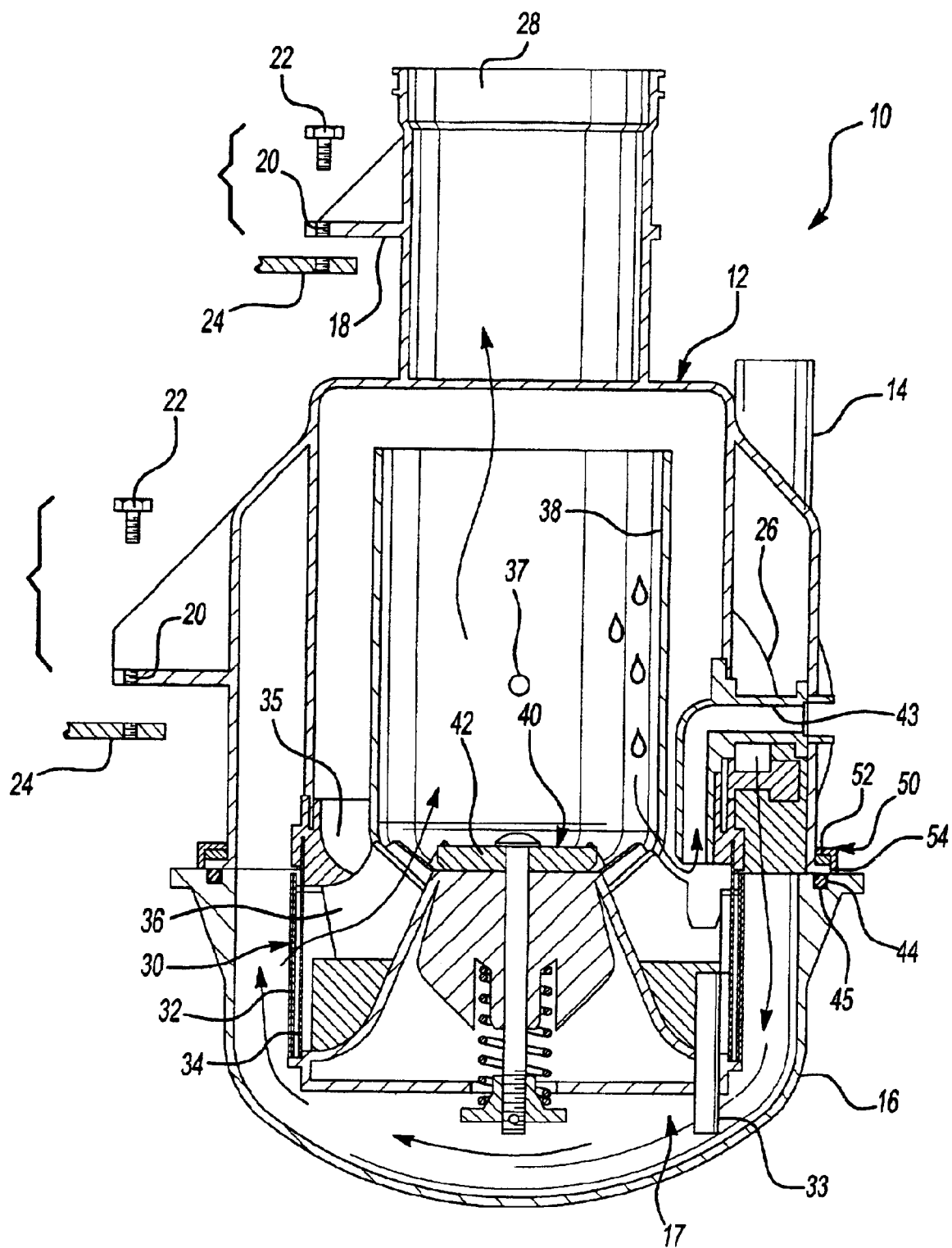
FIG. 1 is a cross-sectional view of the present invention water separator.
Figure 2:
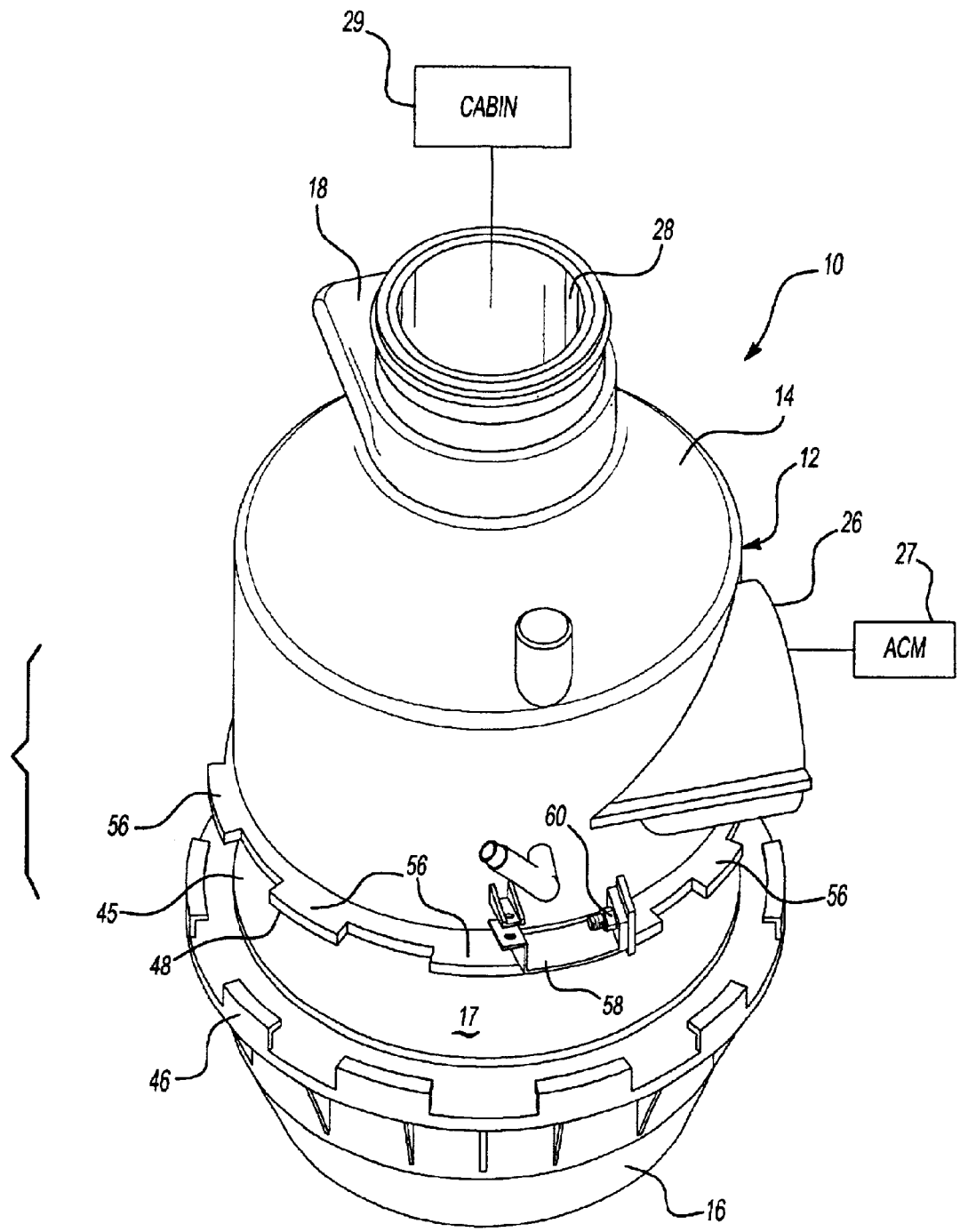
FIG. 2 is a perspective view of the water separator in the open position with the first and second interlocking features aligned.

A water separator 12 is shown in FIG. 1 for an environmental control system. The separator 12 includes upper 14 and lower 16 housing portions that together define an interior cavity 17. The upper housing portion 14 may include brackets 18 having apertures 20 receiving fasteners 22 for securing the separator 12 to a structural aircraft component 24. The upper housing portion 14 may include an inlet 26 connected to an air cycle machine (ACM) and an outlet 28 connected to an aircraft cabin 29, as shown in FIG. 2.

A coalescer assembly 30 is disposed within the interior cavity 17 for separating water from air flowing to the interior cavity 17 from the inlet 26 to the outlet 28. The coalescer assembly 30 includes a mesh coalescer material 32, a screen 34, and fixed vanes 36. The coalescer in conjunction with the screen will catch the larger water droplets and, through the use of gravity, force them to the bottom of the housing portion 16 where the lower drain tube 33 extracts the water to the trough area 35. The coalescer assembly 30 creates a fine water mist with the smaller water droplets that travels upward in an annular flow to the outlet 28 through a tube 38. The diameter of the outlet 28 is smaller than the diameter of the tube 38 such that the annular flow against the tube wall 38 that carries the water droplets makes a 180 degree turn into the main collector section where the water droplets drop out of the air stream. This scavenged flow then is introduced back into the main flow stream via the pressure equalization tube 37. The trough 35 gathers the water and is connected to a water outlet 43 which expels the water from the separator 12.

The separator 12 typically includes a pressure relief valve assembly 40 that includes a valve 42 which opens in the event that the coalescer assembly 30 freezes or becomes clogged with debris. The valve 42 permits air to bypass the coalescer assembly and prevents damage to the separator 12.

Figure 3:
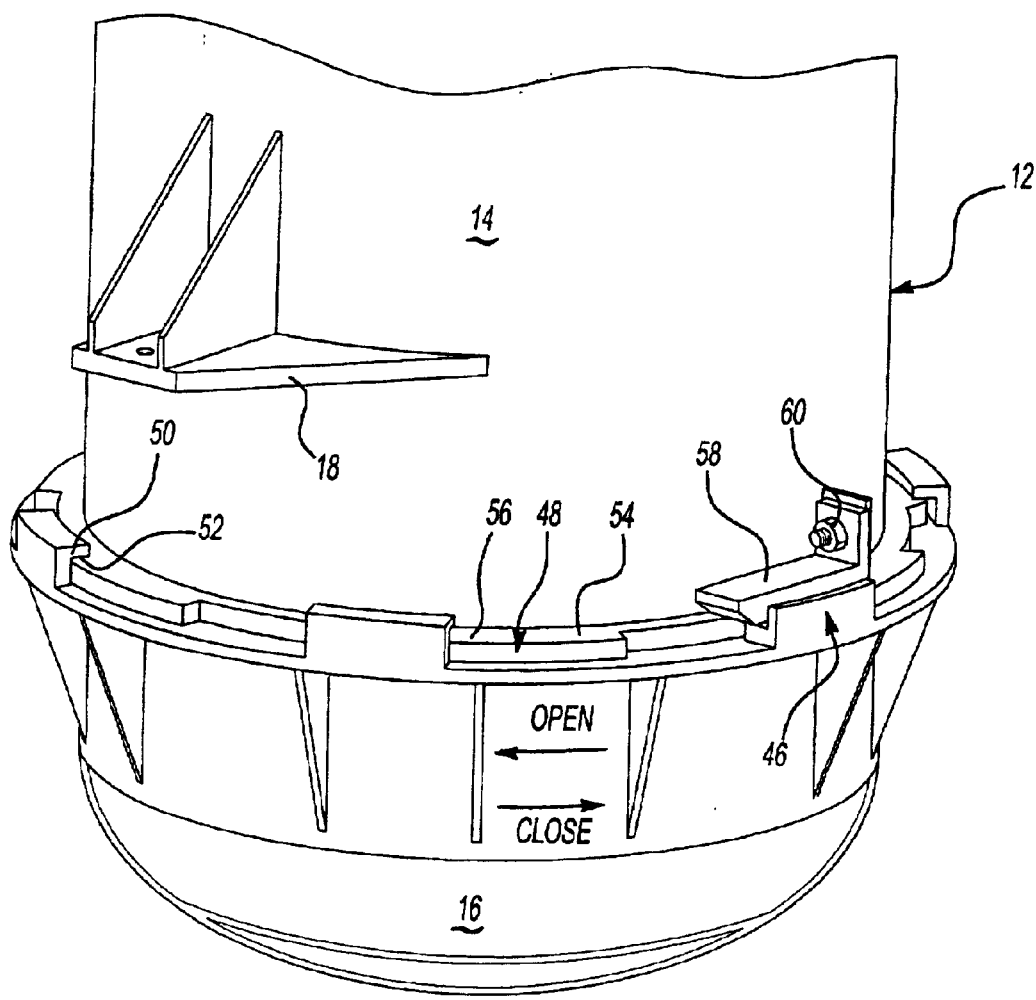
FIG. 3 is an enlarged perspective view of the first and second interlocking features in the closed position.

The lower housing portion 16 includes an annular groove 44 having a seal 45 that creates a water tight and air tight seal between the housing portions 14 and 16. Instead of the V-band coupling connection used in the prior art, the present invention utilizes first 46 and second 48 interlocking features that cooperate with one another in a closed position to secure the housing portions 14 and 16 together. Referring to FIGS. 1–3, the first interlocking feature 46 may include a plurality of flanges 50 arranged circumferentially about the lower housing portion 16. The flanges 50 form slots 52. The upper housing portion 14 may include a plurality of circumferentially arranged tabs 54 that are received by the slots 52 in the closed position. The slots 52 may include tapered leading edges 56 to facilitate the insertion of the tabs 54 into slots 52 when rotating the housing portions 14 and 16 from the open position to the closed position.

A locking clip 58 may be secured to the upper housing portion 14 by a fastener 60. If the clip breaks, it may be removed and replaced. The housing portions 14 and 16 may be constructed from a plastic material available under the trade name CRS5311. The locking clip 58 may be constructed from a plastic material available under the trade name CRS5211. The locking clip thin wall configuration is more flexible than the housing portion to permit the locking clip 58 to deflect as the flange 50 is rotated to the closed position in which a flange is received by the locking clip 58.

It is to be understood that the interlocking features may be varied from the description provided above without departing from the scope of the invention. Furthermore, it is to be understood that the quick connect housing of the present invention may be applied to other aircraft component housings such as those used for pneumatic starters and air cycle machine turbo compressor fans. The present invention has unique applique ability to aircraft components due to the importance of eliminating fastening elements and reducing down time of aircraft.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A water separator for use in an environmental control system comprising:
   first and second housing portions at least partially defining an interior cavity;
   a coalescer assembly disposed within said interior cavity for separating water from air flowing through said interior cavity, said coalescer assembly including vanes fixed relative to one of said housing portions for creating an annular flow of the air, and a mesh material disposed about said vanes for catching the water; and
   first and second interlocking features respectively arranged on said first and second housing portions interlocking with one another in response to moving said first and second housings relative to one another from an open position to a closed position in which said housing portions are secured to one another.

2. The separator according to claim 1, wherein said first interlocking feature includes a flange extending from said first housing portion forming a slot and said second interlocking feature includes a tab protruding from said second housing portion received in said slot in said closed position.

3. The separator according to claim 2, wherein a plurality of tabs and flanges are circumferentially spaced about said first and second housing portions respectively.

4. The separator according to claim 2, wherein at least one of said flange and said slot has a tapered leading edge receiving the other of said flange and said tab from said open position to said closed position.

5. The separator according to claim 4, wherein said tab and said flange lie within a plane in said closed position with said leading edge urging said first and second housing portions toward one another in a direction transverse to said plane.

6. The separator according to claim 1, wherein one of said housings includes an outlet with a first diameter and said coalescer assembly includes tube proximate to said vanes for receiving the air, said tube having a second diameter smaller larger than said first diameter.

7. The separator according to claim 6, comprising a relief valve arranged with said cavity beneath said tube for opening if said coalescer assembly becomes blocked.

8. The separator according to claim 1, wherein one of said housing portions includes at least one bracket having an aperture for receiving a fastening element to mount said separator to a structural aircraft member.

9. A water separator for use in an environmental control system comprising:
   first and second housing portions at least partially defining an interior cavity;
   a coalescer assembly disposed within said interior cavity for separating water from air flowing through said interior cavity;
   first and second interlocking features respectively arranged on said first and second housing portions interlocking with one another in response to moving said first and second housings relative to one another from an open position to a closed position in which said housing portions are secured to one another, said first interlocking feature includes a flange extending from said first housing portion forming a slot and said second interlocking feature includes a tab protruding from said second housing portion received in said slot in said closed position, a plurality of tabs and flanges are circumferentially spaced about said first and second housing portions respectively; and
   a seal is arranged radially inwardly from said circumferentially spaced tabs and flanges and engaging said first and second housings.

10. A water separator for use in an environmental control system comprising:
    first and second housing portions at least partially defining an interior cavity;
    a coalescer assembly disposed within said interior cavity for separating water from air flowing through said interior cavity;
    first and second interlocking features respectively arranged on said first and second housing portions interlocking with one another in response to moving said first and second housings relative to one another from an open position in a closed position in which said housing portions are secured to one another; and
    wherein said first housing portion includes a locking clip engaging said second interlocking feature in said closed position retaining said housing portions in said closed position, said locking clip is secured to said first housing portion with a fastening element.

11. A water separator for use in an environmental control system comprising:
    first and second housing portions at least partially defining an interior cavity;
    a coalescer assembly disposed within said interior cavity for separating water from air flowing through said interior cavity;
    first and second interlocking features respectively arranged on said first and second housing portions interlocking with one another in response to moving said first and second housings relative to one another from an open position to a closed position in which said housing portions are secured to one another; and
    wherein said first housing portion includes a locking clip engaging said second interlocking feature in said closed position retaining said housing portions in said closed position, said first housing portion constructed from a first material and said locking clip constructed from a second material different than said first material.

12. An aircraft component housing comprising:
    first and second housing portions at least partially defining an interior cavity;
    a turbo machine disposed within said interior cavity; and
    first and second interlocking features respectively arranged on said first and second housing portions interlocking with one another in response to moving said first and second housings relative to one another from an open position to a closed position in which said housing portions are secured to one another.

13. The housing according to claim 12, wherein said turbo machine is a pneumatic starter.

14. A method of assembling a water separator for an environmental control system comprising the steps of:
   a) aligning first and second housing portions enclosing a coalescer assembly;
   b) rotating the first and second housing portions relative to one another; and
   c) interlocking first and second features respectively of first and second housing portions in a closed position including engaging one of the first and second features with a locking clip retaining the first and second housing portions in the closed position, the locking clip constructed from a first material different than a second material of the one of the first and second features.

\* \* \* \* \*